United States Patent
Kato et al.

[11] Patent Number: 5,943,208
[45] Date of Patent: Aug. 24, 1999

[54] TERMINAL DEVICE AND MEMORY DEVICE-FASTENING MECHANISM

[75] Inventors: Shinichi Kato; Hiroshi Nagao, both of Kawaski, Japan

[73] Assignee: Fujitsu Limited, Kawasaki, Japan

[21] Appl. No.: 08/918,131

[22] Filed: Aug. 27, 1997

[30] Foreign Application Priority Data

Nov. 13, 1996 [JP] Japan ..................................... 8-300734

[51] Int. Cl.⁶ .................................................. H05K 5/00
[52] U.S. Cl. ................ 361/685; 312/223.1; 248/222.11; 439/894
[58] Field of Search .................................... 361/684, 685, 361/683, 725; 248/500, 222.12, 222.11; 312/223.1, 223.2

[56] References Cited

U.S. PATENT DOCUMENTS

| | | | |
|---|---|---|---|
| 4,713,714 | 12/1987 | Gatti et al. ............................... | 360/137 |
| 5,264,986 | 11/1993 | Ohgami et al. ......................... | 361/685 |
| 5,564,804 | 10/1996 | Gonzalez et al. ..................... | 312/223.2 |
| 5,566,049 | 10/1996 | Nguyen ................................... | 361/685 |
| 5,760,998 | 6/1998 | Berberich et al. ...................... | 361/685 |

FOREIGN PATENT DOCUMENTS

| | | |
|---|---|---|
| 0 763 792 A1 | 3/1997 | European Pat. Off. . |
| 2 226 706 | 7/1990 | United Kingdom . |
| 2 293 051 | 3/1996 | United Kingdom . |

*Primary Examiner*—Steven L. Stephan
*Assistant Examiner*—J. F. Duverne
*Attorney, Agent, or Firm*—Armstrong, Westerman, Hattori, McLeland & Naughton

[57] ABSTRACT

A mechanism for mounting a storage device such as a magnetic disk device to a terminal device, capable of simplifying the attachment/detachment of the storage device, requiring a smaller number of parts for the attachment/detachment and preventing external shock from reaching the storage device. Storage devices are mounted to a frame made of a flexible material such as resin which, in turn, is fastened to a terminal device, without screws, by inserting a portion of the frame into a hole on the terminal device. Means made of a flexible material are provided on the upper surface of the frame for fastening the storage devices for absorbing the external shock or vibration by the elasticity thereof.

19 Claims, 22 Drawing Sheets

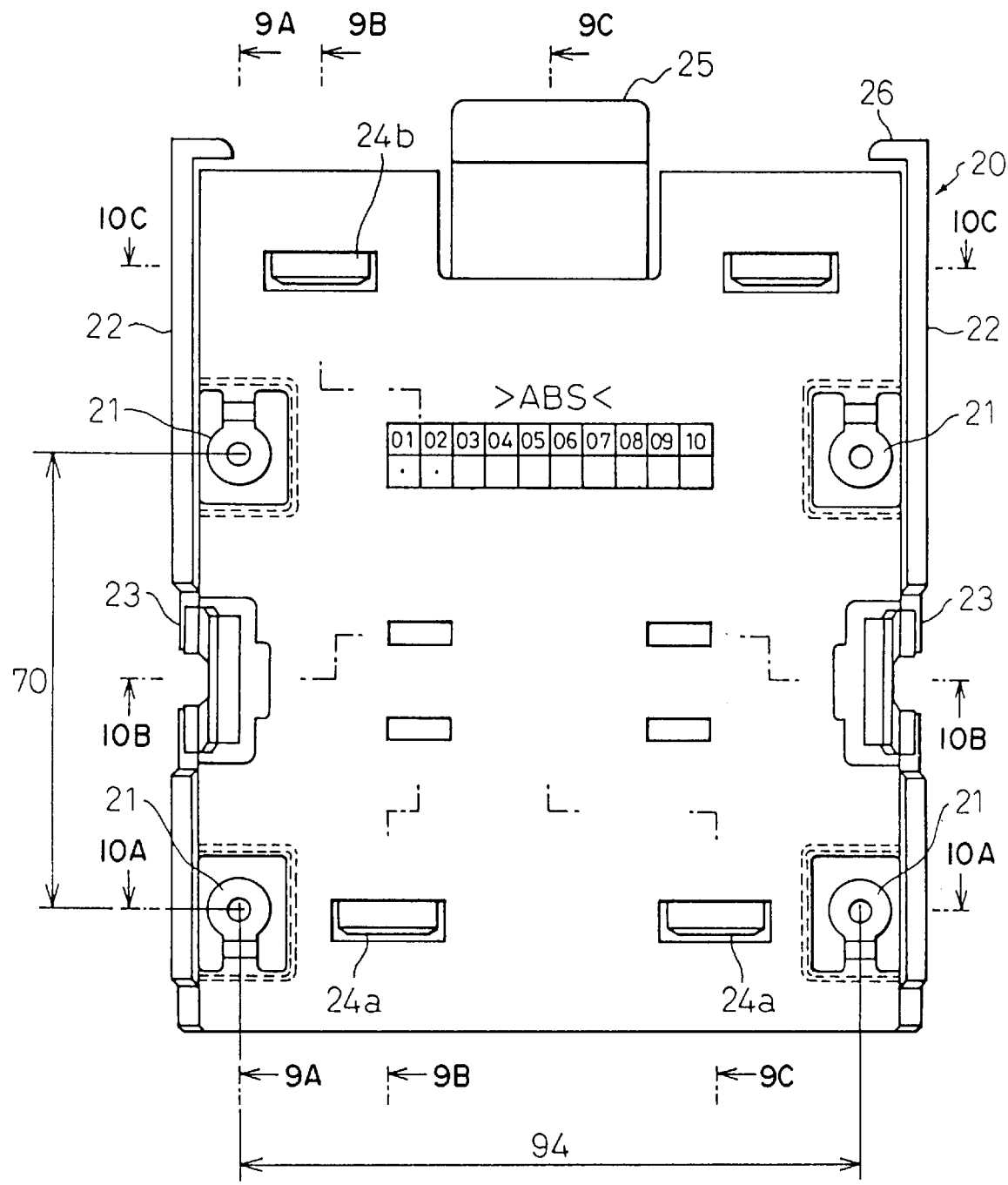

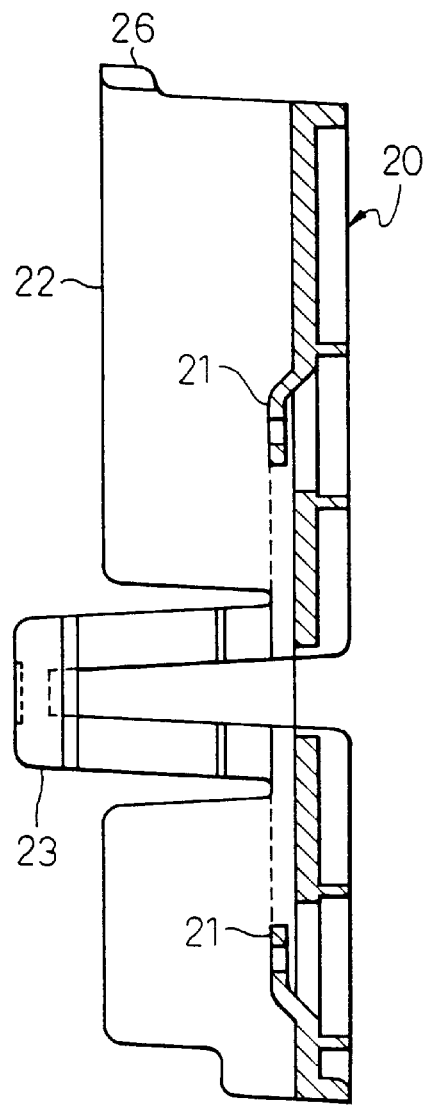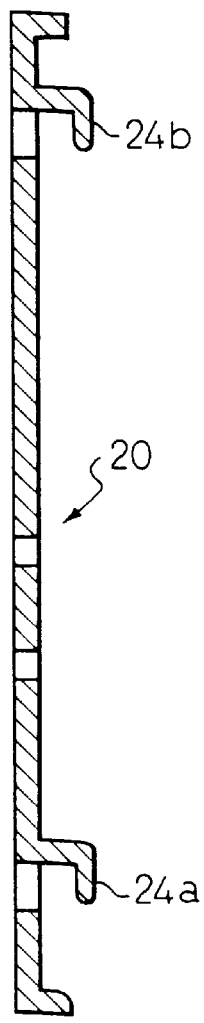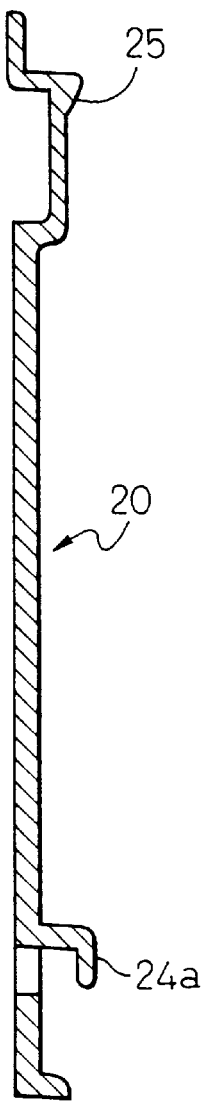

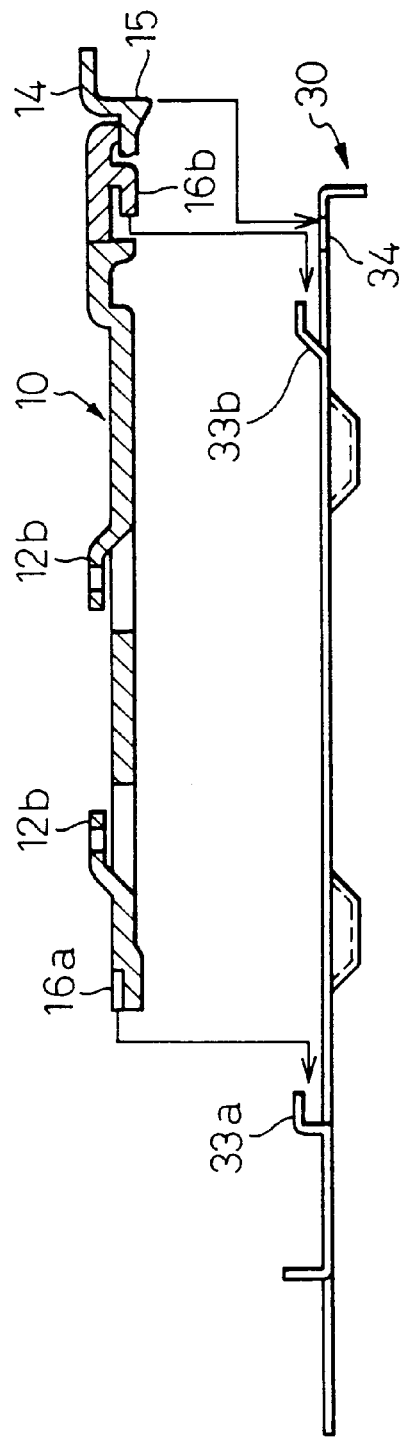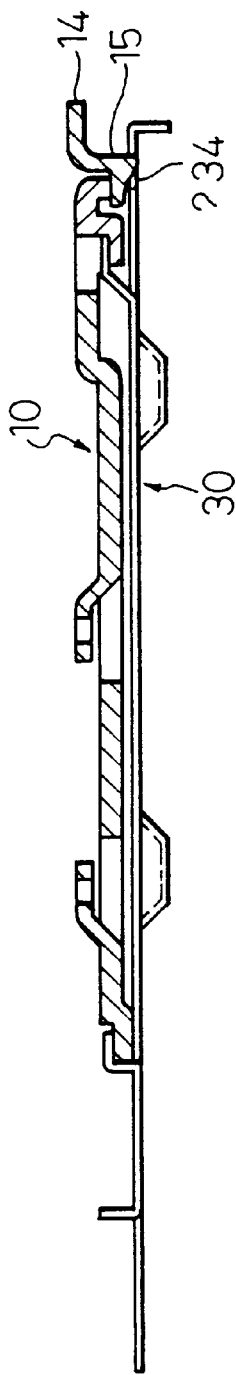

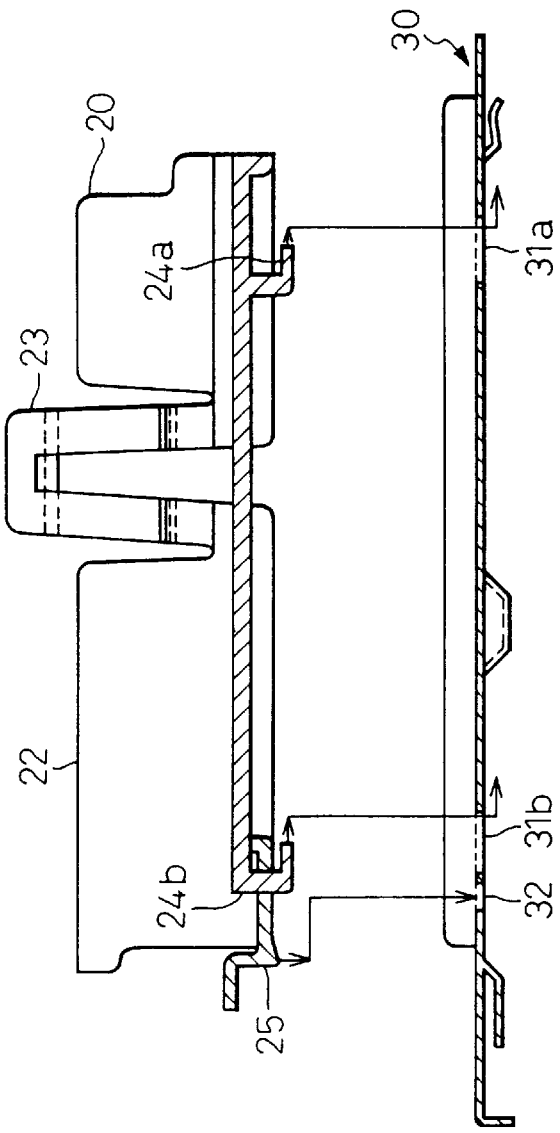
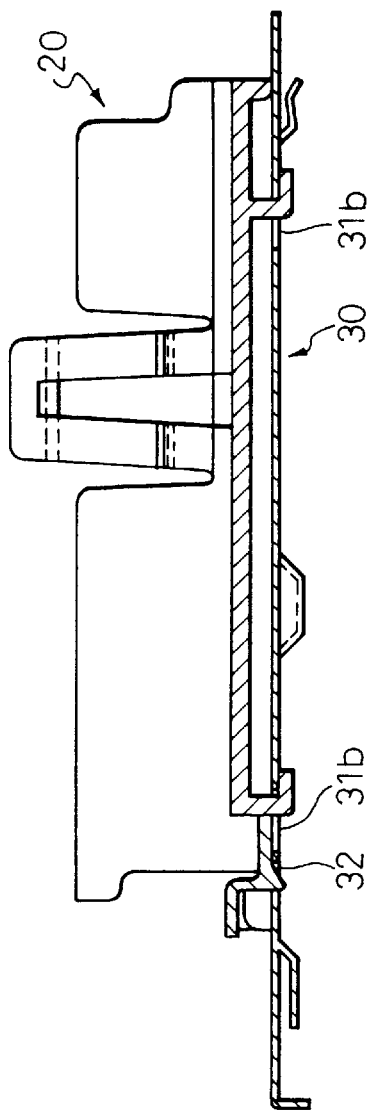

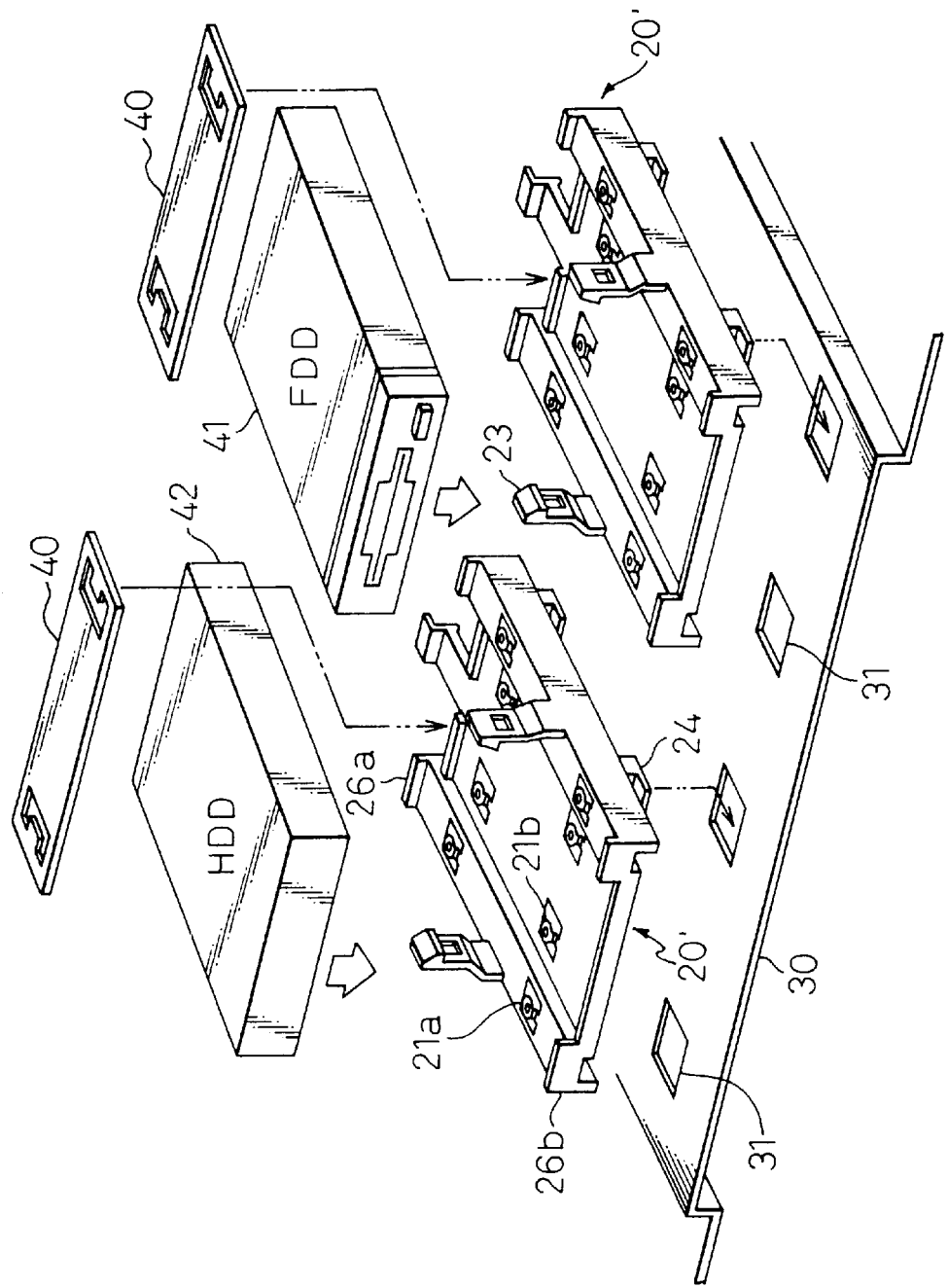

Fig. 22C
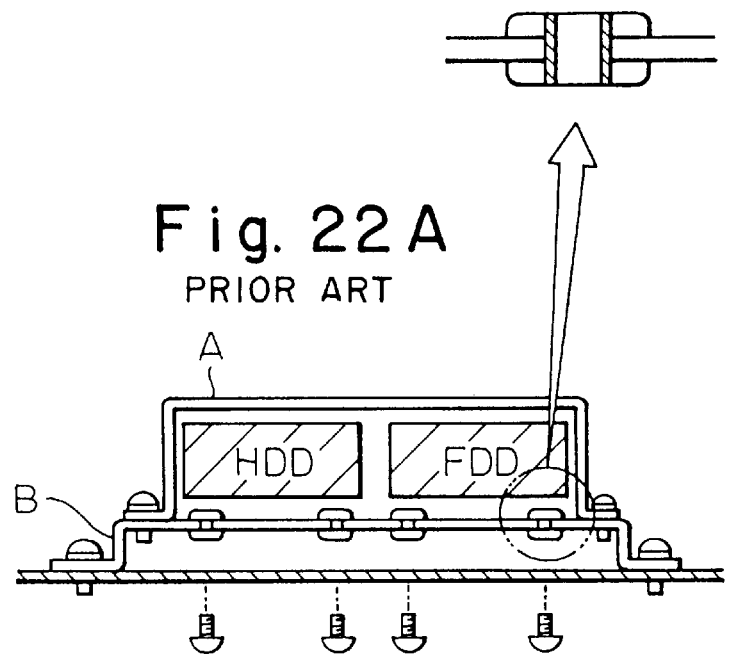
Fig. 22A
PRIOR ART
Fig. 22B
PRIOR ART
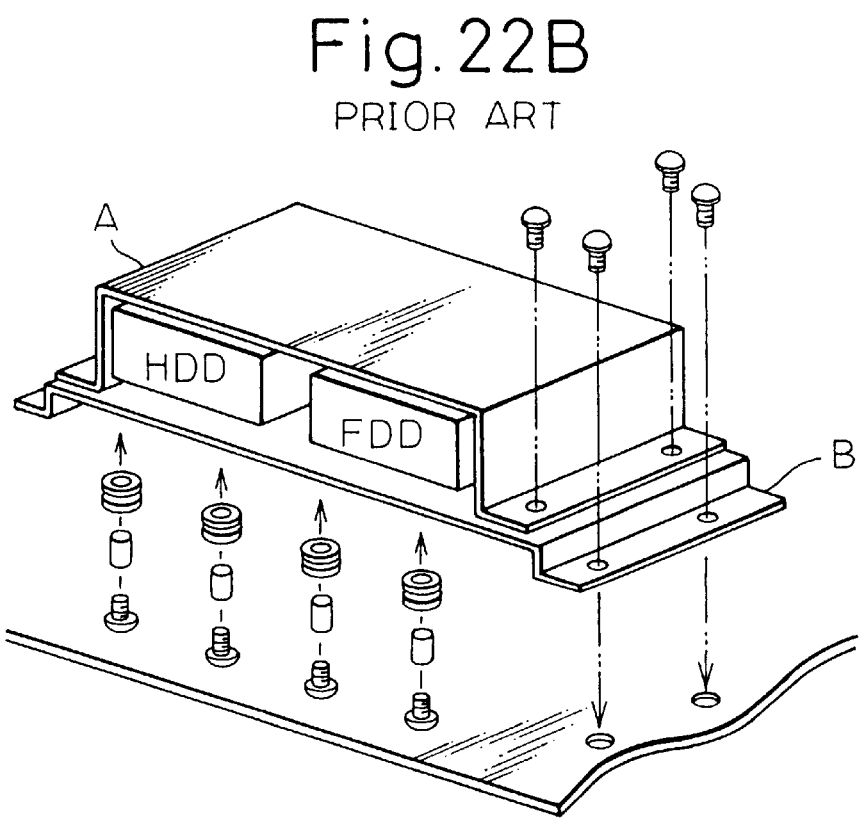

Fig.23C
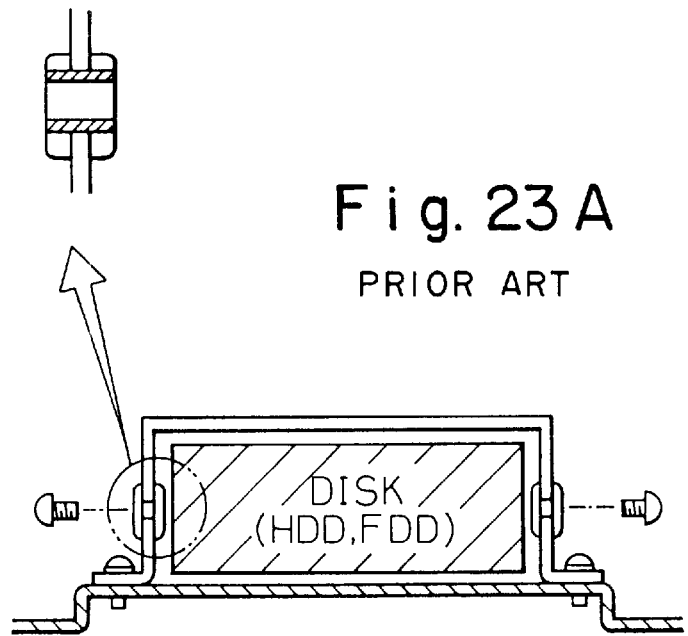
Fig.23A
PRIOR ART
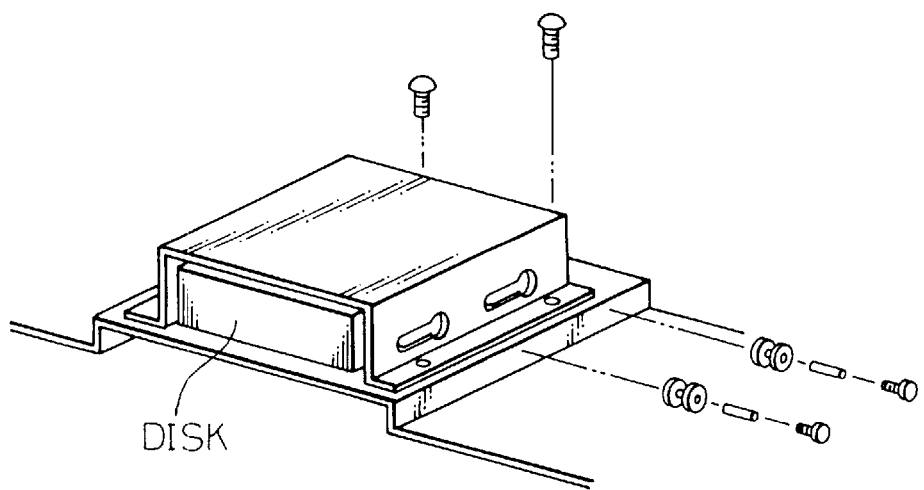
Fig.23B
PRIOR ART

TERMINAL DEVICE AND MEMORY DEVICE-FASTENING MECHANISM

BACKGROUND OF THE INVENTION

1. Field of the Invention

The present invention relates to a terminal device to which a storage device is mounted, and a storage device fastening mechanism for fastening the storage device. Particularly, it relates to a terminal device, which generates vibration during operation, such as a POS (Point-Of-Sales) terminal device. The vibration accompanies the opening/shutting operation of a drawer.

Most of recent terminal devices such as a computer or others necessarily have, as a storage device, a magnetic storage device (file disk) such as a hard disk drive (HDD) or a floppy disk drive (FDD). To mount such a storage device to the terminal device, various mechanisms have been adopted.

2. Description of the Related Art

The file disk reads information recorded on a magnetic disk and records information thereon, while rotating the magnetic disk by a motor, using a magnetic head attached to an arm which is driven to rotate about a pivot.

If vibration or shock is externally applied to the terminal device mounting such a storage device thereon during the reading or recording of information, the magnetic head may deviate from the proper position to cause the incorrect reading/recording of information or touch a surface of the magnetic disk, on which information is recorded, to damage the information.

A POS terminal device will be described below as an example of a terminal device which frequently generates vibration. The POS terminal device has a drawer for holding cash therein to transfer the same between customers and the operator. The drawer is normally closed, but temporarily made to open for the purpose of cash delivery/acceptance when one sale has been over, and then is shut again by the operator.

Due to this opening/shutting operation of the drawer, a relatively large vibration occurs in the POS terminal device. Particularly, when the drawer is open, the vibration is considerable because a spring force is used for this purpose. On the other hand, to record a history of sales carried out in the POS terminal device, a disk file device is provided in the POS device. Since the disk file device is often accommodated in a controller section provided on the drawer, the read error on the disk or the like may frequently occur due to shock caused by the opening/shutting of the drawer.

Such a problem is not limited to the POS terminal device but is common to generally used personal computers or others if they are located in the vicinity of a vibration source or in an environment wherein a relatively intense vibration is liable to be transmitted to the computer body. Under the circumstances, the disk device in the personal computer may be broken as in the POS terminal device.

To prevent the vibration from being transmitted to the storage device, various proposals have been made in the prior art.

In FIGS. 22A and 22B, a conventional structure for securing a magnetic disk device to a terminal device is illustrated. In the structure shown in FIGS. 22A and 22B, the magnetic disk device is not directly attached to a base plate of a terminal device, but is once attached to a frame which in turn is fastened to the base plate.

The frame consists of a frame B for mounting the magnetic disk device and a frame A attached to the frame B as a cover.

On the bottom surfaces of HDDs, and FDDS, screw holes are provided for screw-fastening these magnetic disk devices. These magnetic disk devices are fastened to the frame B via the screw holes. If the magnetic disk device is directly mounted to the frame B, external vibration may be transmitted to the magnetic disk device. Therefore, a countermeasure thereto is necessary.

According to the structure shown in FIGS. 22A and 22B, a steel collar spacer is inserted into a central hole of a grommet made of an elastic material such as rubber, which in turn is fitted into a screw hole of the frame B. The magnet disk device is placed on the grommet and screw-fastened. Since the grommet is capable of absorbing shock by its elasticity, it is possible to mitigate shock caused by the opening/shutting of drawer and reduce the magnitude of shock transmitted to the magnetic disk device.

FIGS. 23A and 23B illustrate another conventional structure for fastening a magnetic disk device. In this structure, the magnetic disk device is attached to a frame corresponding to the frame A shown in FIGS. 22A and 22B.

The frame has screw holes for fastening the magnetic disk device on the opposite side surfaces thereof. Also, in the structure shown in FIGS. 23A and 23B, since the magnetic disk device is attached via the grommets and the collar spacers, it is possible to minimize vibration directly transmitted to the magnetic disk device.

In the conventional structures shown in FIGS. 22A, 22B, 23A, and 23B, however, fastening of the magnetic disk device to the frame or fastening of the frame to the base plate is carried out using screws, which results in the increase in the number of parts necessary for fastening the magnetic disk device, causing problems in that the man-hours necessary for the assembly, or the dismounting for the purpose of maintenance, increase. Also, manufacturing cost rises as the number of parts increases.

The above method for mounting the magnet disk device to the frame requires the use of a metallic plate, which results in an increase in the frame cost.

Accordingly, an object of the present invention is to provide a terminal device and a storage device fastening mechanism, capable of avoiding the adverse effect of external shock on the storage device.

Another object of the present invention is to realize a storage device fastening mechanism easily attachable/detachable to a terminal device, having a smaller number of parts, and the terminal device incorporating such a mechanism therein.

Also, a further object of the present invention is to realize a fastening mechanism for a storage device which is easily manufactured at a low cost.

SUMMARY OF THE INVENTION

To solve the above problems, according to the present invention, a terminal device is provided, comprising a frame for detachably mounting an information storage device for storing information, and a base plate for detachably mounting the frame for mounting the storage device. The storage device mounting frame is made of a flexible member.

According to the above structure, it is possible to simplify the operation for mounting the storage device to the terminal device. Also, it is possible to eliminate a metallic frame and thus reduce the manufacturing cost.

In the terminal device according to the present invention, side engaging portions are provided on the bottom surface of the storage device mounting frame, to be inserted into mating engaging portions provided on the base plate, and the storage device mounting frame is provided with means for limiting the movement of the base plate in the inserting direction of the storage device mounting frame into the base plate, when the frame side engaging portions are engaged with the base plate side engaging portions, so that the storage device mounting frame is fastened to the base plate.

According to this structure, the attachment/detachment of the frame to the terminal device can be simplified because no screws are used for fastening the frame to the base plate, which results in the reduction in the number of parts.

The present invention also provides a storage device fastening mechanism for detachably mounting a storage device for storing information, wherein the fastening mechanism is integrally formed of a flexible member, and has storage device fixtures on the bottom surface thereof, for supporting the bottom surface of the information storage device placed thereon.

The storage device fixture may have a hole for a screw so that the storage device is fastened to the storage device fixture by the screw. The storage device fastening mechanism may further comprise a retainer for retaining the opposite sides of the storage device to be mounted, the retainer being provided with an engaging portion to be engageable with a member for holding the upper side of the storage device.

According to the above storage device fastening mechanism, external shock can be absorbed because the storage device fixture has elasticity, whereby it is possible to minimize the shock or vibration directly transmitted to the storage device. Also, the storage device is easily attached to or detached from the storage device fastening mechanism by such storage device fixture and retainer.

The storage device fastening mechanism further comprises a first storage device fixture for fastening a first storage device, and a second storage device fixture for fastening a second storage device having a size different from that of the first storage device. According to this structure, it is possible to mount storage devices having various sizes to a common storage device fastening mechanism.

An area of the bottom surface of the storage device fastening mechanism in which the first storage device fixture is provided and that in which the second storage device fixture is provided are at different levels from each other. Thereby, it is possible to show the operator a position of a proper storage fixture at which a corresponding storage device is to be mounted.

In the storage device fastening mechanism for fastening a storage device to be mounted to a terminal device according to the present invention, engaging portions are provided on the bottom surface thereof, to be inserted into a base plate of the terminal device. According to this structure, the attachment/detachment of the storage device fastening mechanism to the terminal device can be easily carried out without using screws.

The storage device fastening mechanism for fastening a storage device to be mounted to a terminal device according to the present invention comprises a plurality of storage device fixtures made of a flexible material and provided on the bottom surface of the storage device fastening mechanism, to be engageable with the bottom surface of the storage device, a fastening mechanism mounting portion provided on a surface opposite to the surface on which the storage device fixtures are provided, for mounting the storage device fastening mechanism to the terminal device, and a mounting mechanism for fastening the storage device fastening mechanism mounted to the terminal device to the terminal device.

The storage device fastening mechanism is integrally formed of a flexible member, and the storage device fixture is adapted to support the bottom surface of the storage device by the elasticity of the flexible member. Also, the storage device fixture comprises a first fixture for fastening a first storage device, and a second fixture for fastening a second storage device having a different size from that of the first storage device.

An area in the bottom surface of the storage device fastening mechanism, in which one of the first and second fixtures corresponding to the storage device of a smaller size is provided, is at a level lower than that for the other storage device.

Also, this mechanism comprises a storage device retainer for holding a side of the storage device; the storage device retainer having a mounting portion for mounting a plate-like member for pressing the upper surface of the storage device secured to the storage device fastening mechanism.

BRIEF DESCRIPTION OF THE DRAWINGS

These and the other objects of the invention will become apparent from the following detailed description of the preferred embodiments of the invention, taken in connection with the accompanying drawings.

In the drawings:

FIG. 7 is a top view of a frame according to another embodiment of the present invention;

FIGS. 9A, 9B, and 9C are lengthwise sectional views of the frame;

FIG. 17A is a side sectional view of one type of frame separated from the base plate, and FIG. 17B is a side sectional view of the frame mounted on the base plate;

FIG. 18A is a side sectional view of the other type of frame separated from the base plate, and FIG. 18B is a side sectional view of the other type of frame mounted on the base plate;

FIG. 19 is an exploded perspective view of a further fixture mechanism with another type of frame;

FIG. 22A is a fragmentary cross-sectional view of a conventional fixture mechanism, and FIG. 22B is an exploded perspective view of a further conventional fixture mechanism; and FIG. 23A is fragmentary cross-sectional view of a further conventional fixture mechanism, and FIG. 23B is a perspective view of the further conventional mechanism.

DESCRIPTION OF THE PREFERRED EMBODIMENTS

Figure 1:
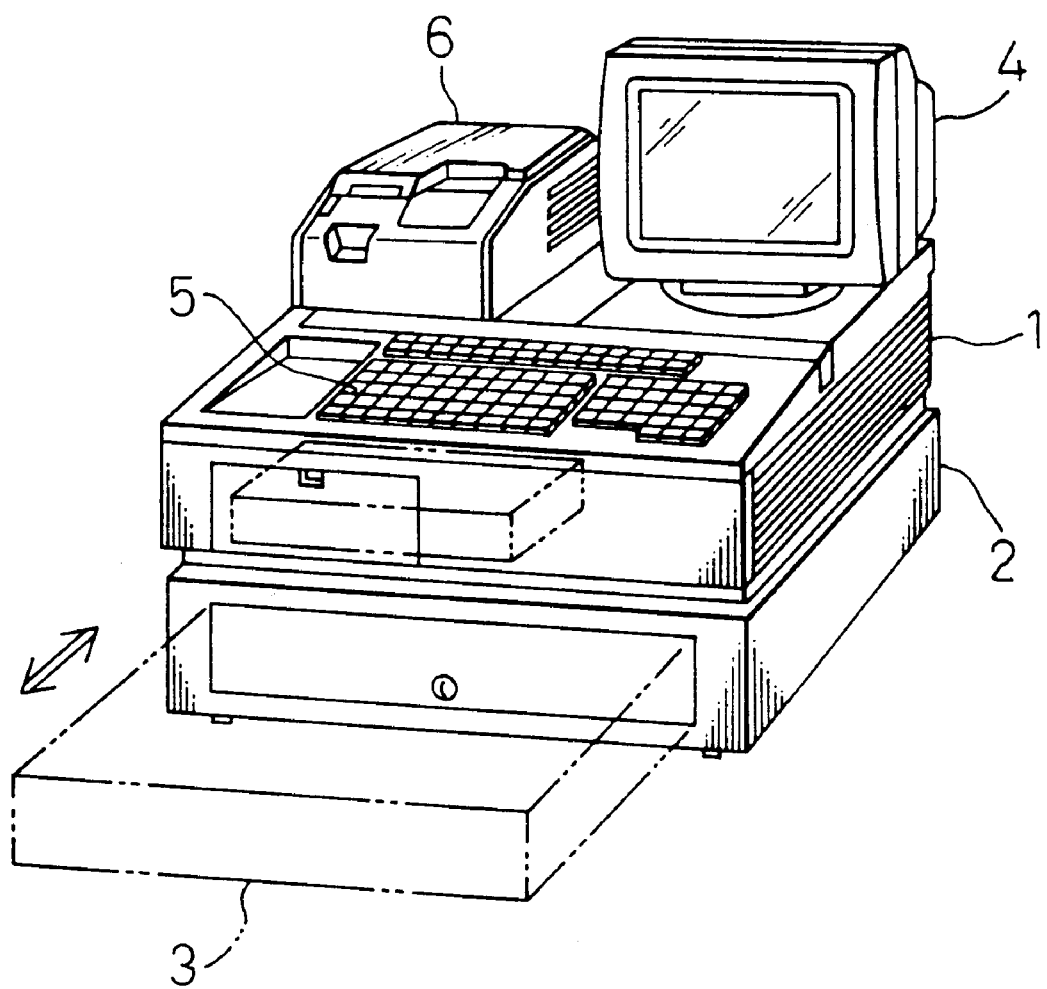
FIG. 1 is an illustration of an appearance of a POS terminal device.

FIG. 1 illustrates a POS terminal to which is applied a fixture mechanism for a memory device according to one embodiment of the present invention. In this embodiment, the memory device is a magnetic disk device (an HDD or an FDD).

The POS terminal is roughly divided into a controller section 1 and a drawer section 2. The controller section 1 has a control device (such as CPU) for supervising various processes conducted by the POS terminal, and carrying a magnetic disk device (corresponding to a disk part in the drawing) in the interior thereof. Above the controller section 1, there are a keyboard 5 for inputting information, a display 4 and a printer 6 for printing receipts and journals.

The magnetic disk device stores specified information on sales to customers, registered via the POS terminal, and PLU (price lookup) information including article codes, prices, names or others, for retrieving the article price and/or name based on the input article code.

Beneath the controller section 1, the drawer section 2 is provided for keeping cash to be transferred from/to customers. The drawer section 2 has a drawer 3 which is made to open and shut when the cash is transferred from/to the customer. Since the drawer 3 is relatively frequently made to open and shut, and generates vibration at that time, it is necessary to prevent such vibration from reaching the magnetic disk device particularly when the same is in operation.

A fixture mechanism for a magnetic disk device according to this embodiment will be described below.

Figure 2:
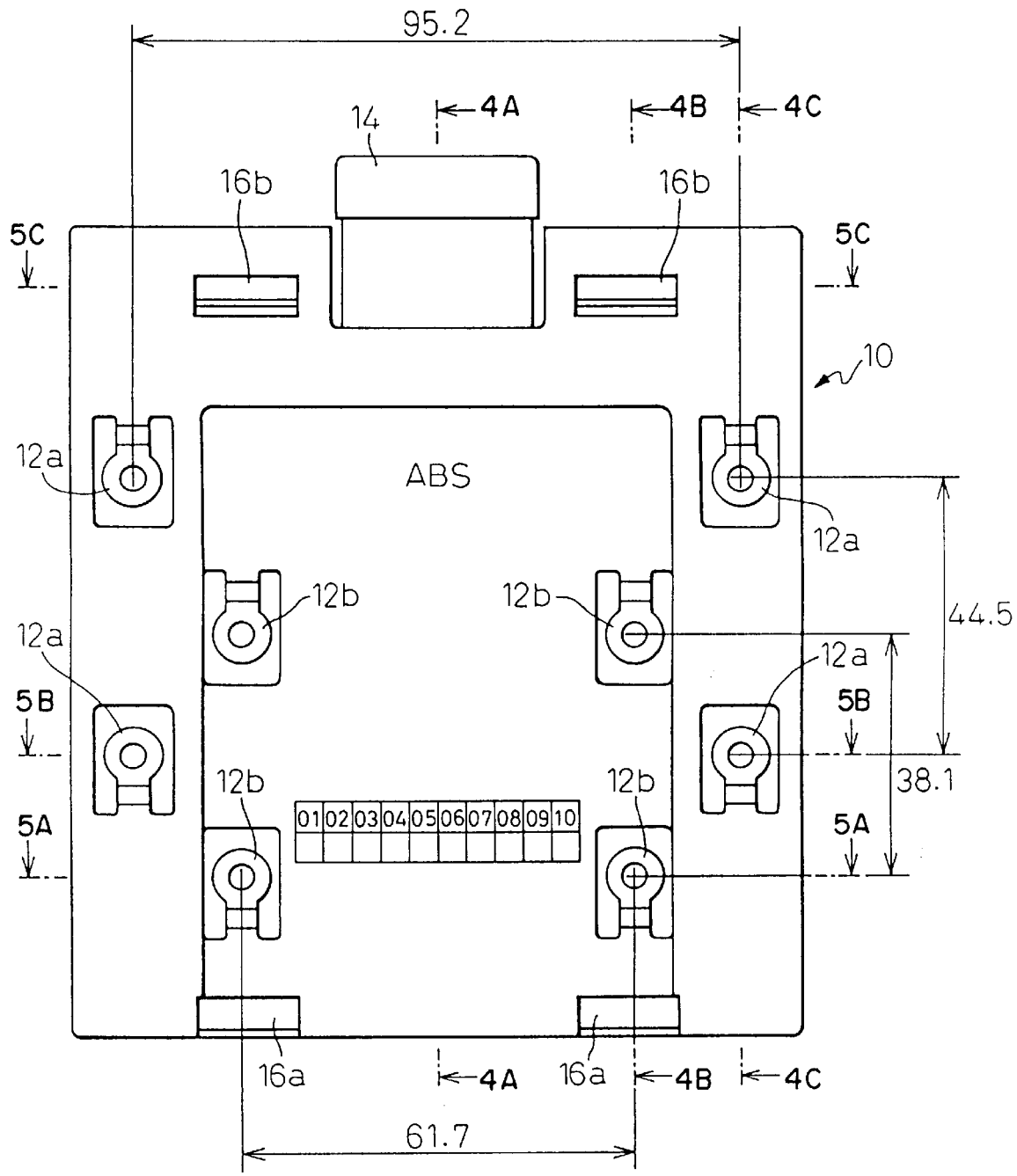
FIG. 2 is a top view of a frame for securing a disk device, according to one embodiment of the present invention.
Figure 3A:
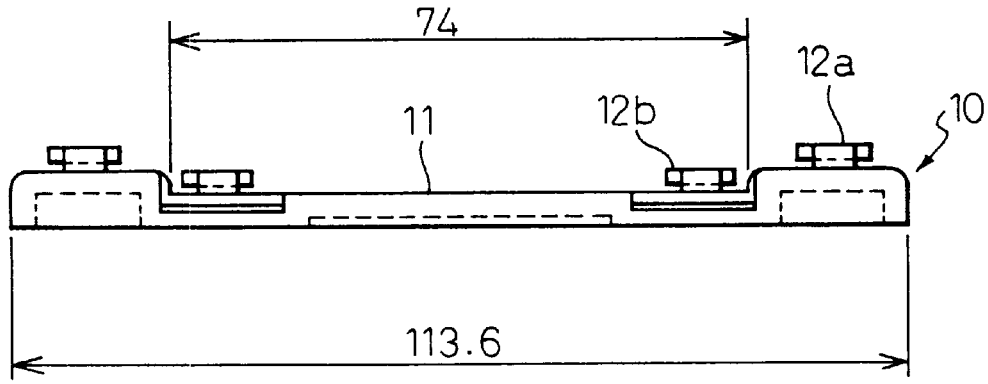
FIGS. 3A, 3B, and 3C are front, back, and side views of the frame, respectively.
Figure 3B:
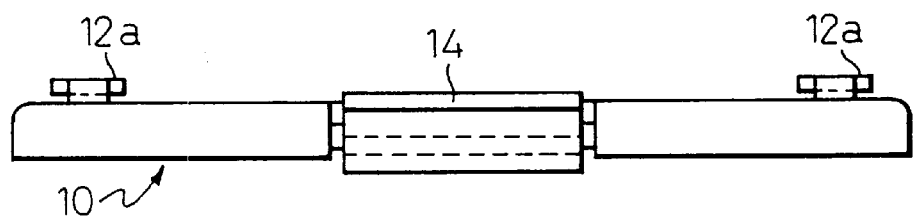
Figure 3C:
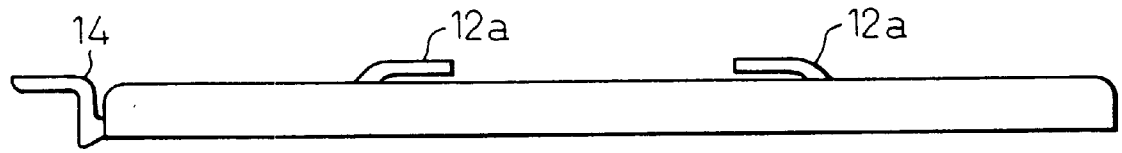
Figure 4A:
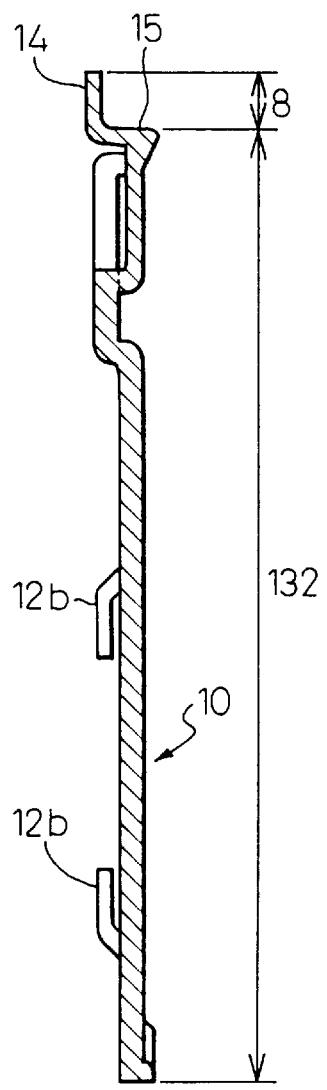
FIGS. 4A, 4B, and 4C are lengthwise sectional views of the frame.
Figure 4B:
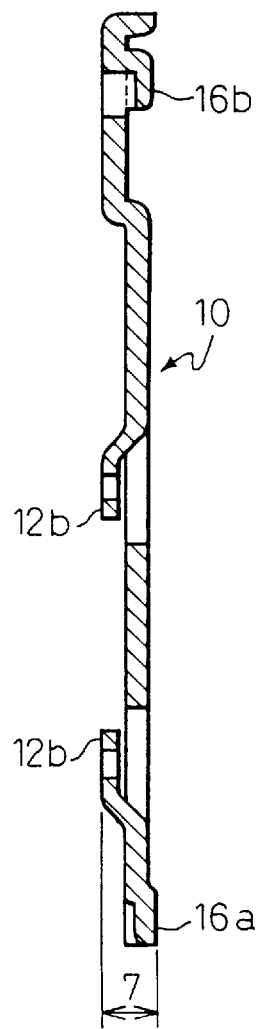
Figure 4C:
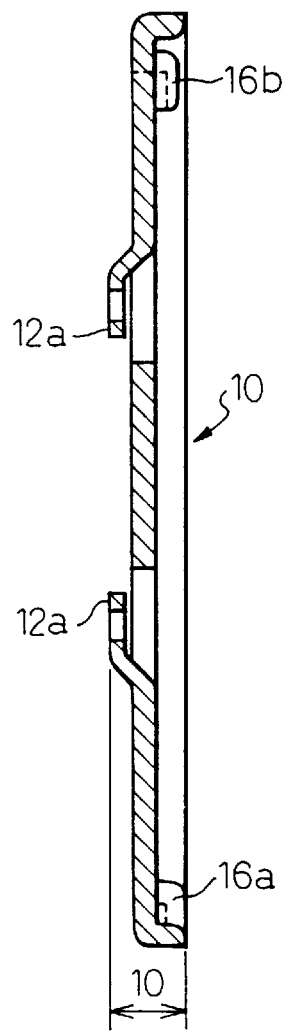
Figure 5A:
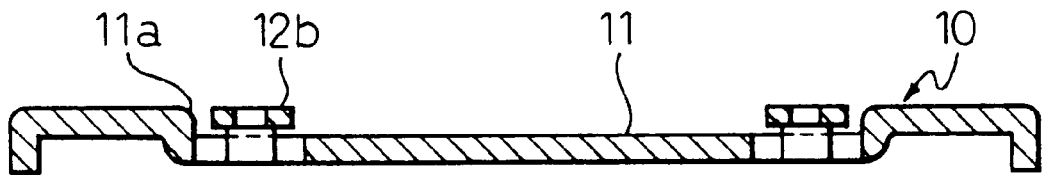
FIGS. 5A, 5B, and 5C are widthwise sectional views of the frame.
Figure 5B:
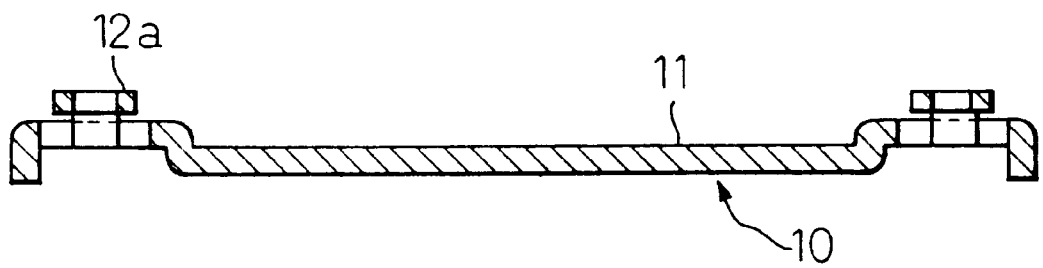
Figure 5C:
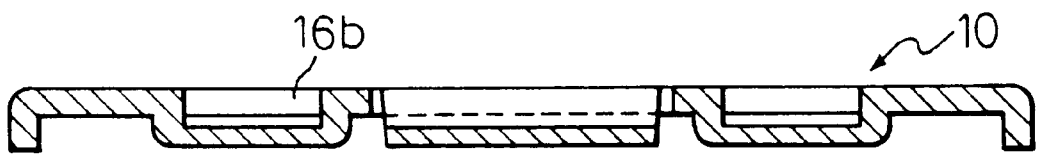
Figure 6:
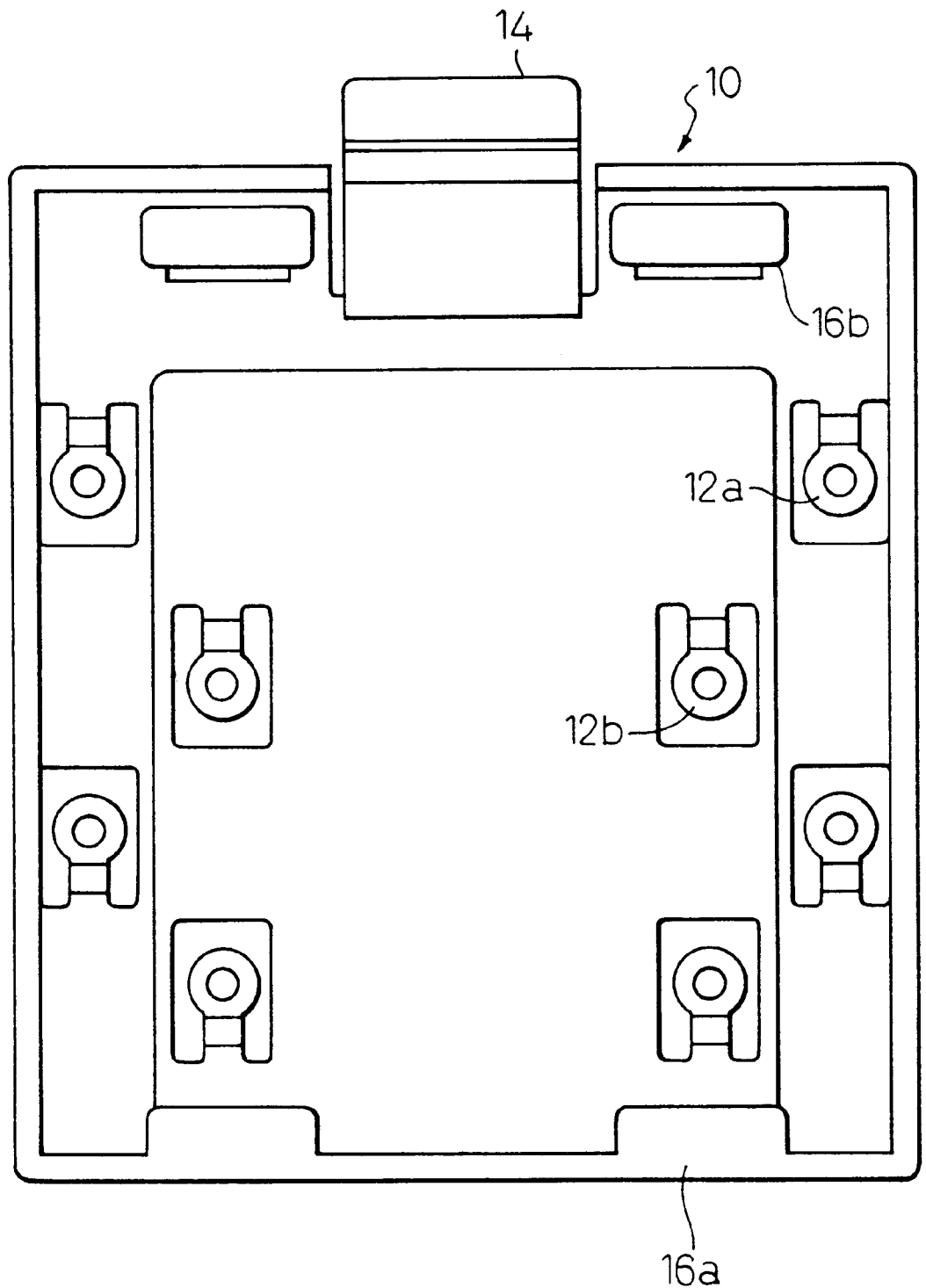
FIG. 6 is a bottom view of the frame.

FIG. 2 is a top view of a HDD fixture mechanism according to this embodiment (hereinafter referred to as a frame). FIG. 3A is a front view of the frame shown in FIG. 2; FIG. 3B is a back view thereof; and FIG. 3C is a side view thereof. FIGS. 4A, 4B, and 4C are lengthwise sectional views of the frame, respectively, wherein FIG. 4A is a view taken along line A—A in FIG. 2; FIG. 4B is a view taken along line B—B in FIG. 2; and FIG. 4C is a view taken along line C—C in FIG. 2. Similarly, FIGS. 5A, 5B, and 5C are widthwise sectional views of the frame, respectively, wherein FIG. 5A is a view taken along line D—D; FIG. 5B is a view taken along line E—E; and FIG. 5C is a view taken along line F—F. In addition, FIG. 6 is a bottom view of the frame shown in FIG. 2.

The fixture mechanism of this embodiment will be explained based on FIGS. 2 to 6.

The frame 10 is molded from a resin. The resin-molded frame is more advantageous in manufacturing cost than a metallic frame. Further, since members constituting the frame are preferably elastic and soft as described in detail later, a resin is suitable for such members. Of course, a metallic frame can be used.

On the upper surface of the frame 10, disk fixtures 12 are provided for fastening an HDD. In the illustrated frame 10, there are eight disk fixtures 12. Of them, the disk fixture 12a fastens a so-called 3.5 inch disk wherein a magnetic disk of 3.5 inch diameter is used, while the disk fixture 12b fastens a so-called 2.5 inch disk wherein a magnetic disk of 2.5 inch diameter is used.

Existing terminal devices mainly have as HDDs the above-mentioned two kinds of devices wherein the 2.5 inch disk is smaller in size. However, the kind of HDD to be selected may be changed in accordance with the user's demand on a size, memory capacity or processing speed. It is necessary to adapt the terminal device to be capable of carrying thereon any kind of HDD selected by the user.

It may be possible to individually prepare frames for the 2.5 inch disk and the 3.5 inch disk, respectively. However, this may result in the problem of increase in stocked parts (i.e. frames). The frame of carrying HDD is preferably one kind which is adaptable to a plurality of kinds and sizes of HDD.

The disk fixtures 12a for 3.5 inch disk are arranged at a lengthwise distance of 44.5 mm and a widthwise distance of 95.2 mm. The disk fixture 12b for 2.5 inch disk are arranged at a lengthwise distance of 38.1 mm and a widthwise distance of 61.8 mm. These distances are determined in accordance with the outer dimensions of the respective HDD.

At a center of the disk fixture 12, a hole is provided for fastening the magnetic disk device by a screw. The screw is inserted into the hole from the bottom surface of the frame 10 and screw-engaged with a threaded hole provided on the bottom surface of HDD, whereby HDD is fastened to the frame 10. In this regard, the hole in the disk fixture 12 has a larger diameter than that of the screw so that the screw can freely pass therethrough.

As is apparent from a side view, the disk fixture 12 is located at a position somewhat higher than the bottom surface of the frame 10. Since the disk fixture 12 is located above the bottom surface of the frame 10 at a gap therefrom, it is possible to reduce the vibration directly transmitted from the bottom surface of the frame 10 to the HDD. Particularly, if the frame 10 is formed of a resin having a relatively large elasticity, the disk fixture 12 can function as a bumper using the elasticity of the resin. Thereby, the vibration applied from outside to HDD can be absorbed by the disk fixture to some extent.

The disk fixtures 12a for 3.5 inch disk are arranged in the peripheral area of the frame 10, and those 12b for 2.5 inch disk are in inner area thereof. As is apparent from a front view as shown in Figures, specifically in FIG. 3A, the inner area 11 of the bottom surface of the frame 10 carrying the disk fixture 12b for a 2.5 inch disk is lower than the peripheral area thereof carrying the disk fixture 12a for a 3.5 inch disk. By differentiating in such a manner the height of the area carrying the disk fixture for an HDD of the respective size, it is possible to identify at a glance which disk fixture is adapted to an HDD of the aimed size among the eight disk fixtures.

A cross-section of the area 11 of the frame 10 carrying the disk fixture 12b for a 2.5 inch disk has a width of about 70 mm in the illustrated embodiment. However, the width may not be limited to this value provided it is sufficient for accommodating the 2.5 inch disk but insufficient for accommodating the 3.5 inch disk. According to this adaptation, it is possible to eliminate the erroneous mounting of HDD onto an unsuitable disk fixture.

Even if the operator first fastens a 2.5 inch disk to one of the disk fixtures 12a for a 3.5 inch disk on the frame 10, he will immediately recognize that this is erroneous because there is no disk fixture at a position opposite thereto in the widthwise direction.

On the other hand, even if the operator fastens a 3.5 disk to the disk fixture 12b for a 2.5 inch disk, he will immediately find that this is erroneous because it is impossible to maintain the HDD in a horizontal position.

At a front end of the frame 10, engaging portions 16a are provided for attaching the frame 10 to a base plate of the terminal device described in detail later. At a rear end of the frame 10, engaging portions 16a are provided for attaching the frame 10 to a base plate of the terminal device. These engaging portions 16 are engageable with mating portions of the base plate as described in detail later.

In addition, a lever 14 extends from the rear end of the frame 10, for fastening the frame 10 to the base plate. As apparent from the sectional view of the frame 10, the lever 14 has a projection of a triangular cross-section.

The mounting of the frame 10 to the base plate will be described later and in detail.

FIG. 7 is a top view of a frame for carrying an FDD according to the present invention. Similar to the frame shown in FIG. 2, this frame is molded in resin.

Figure 8A:
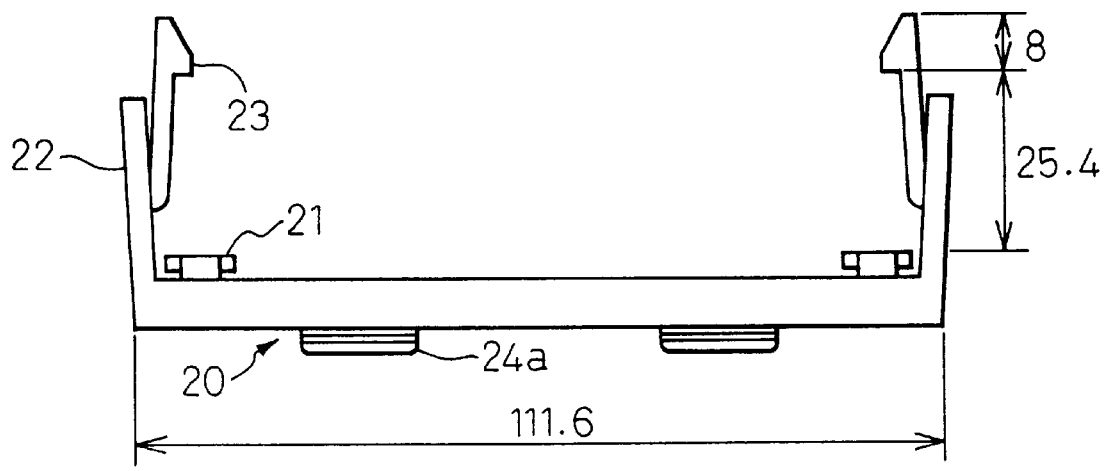
FIGS. 8A, 8B, and 8C are front, back, and side views of the frame, respectively.
Figure 8B:
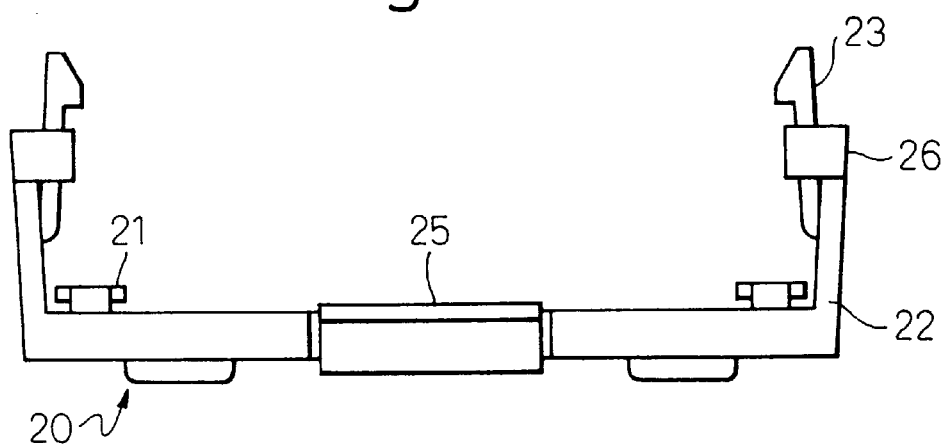
Figure 8C:
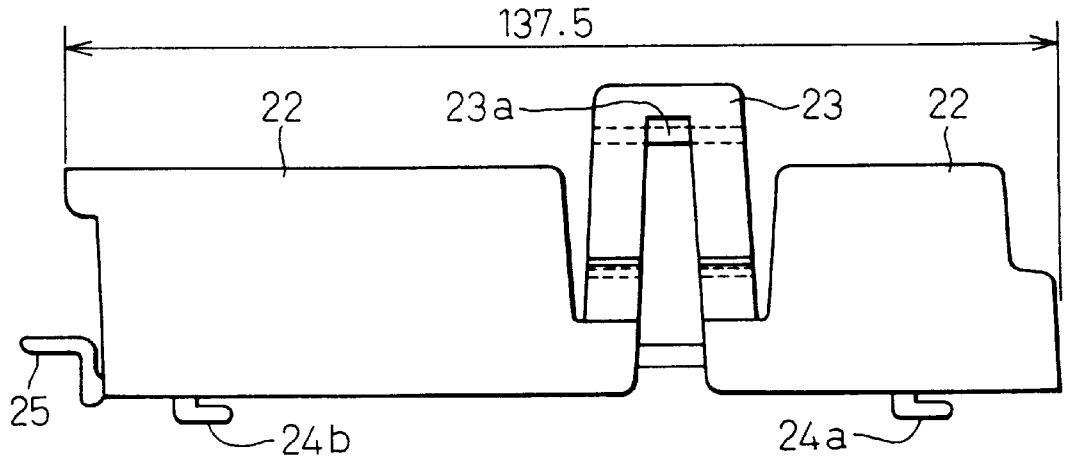
Figure 10A:
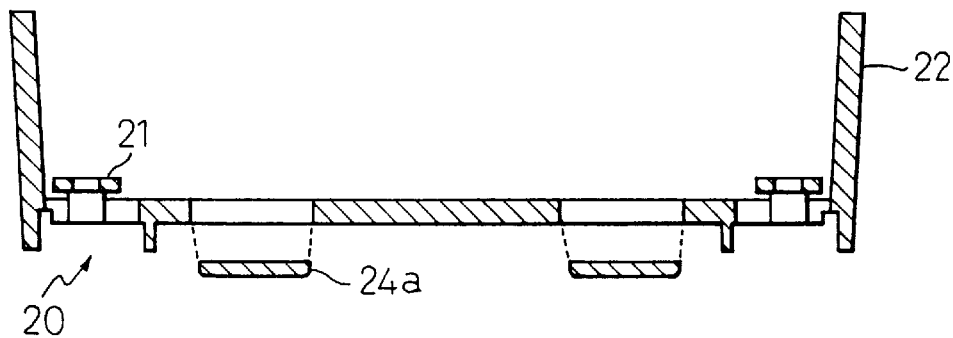
FIGS. 10A, 10B, and 10C are widthwise sectional views of the frame.
Figure 10B:
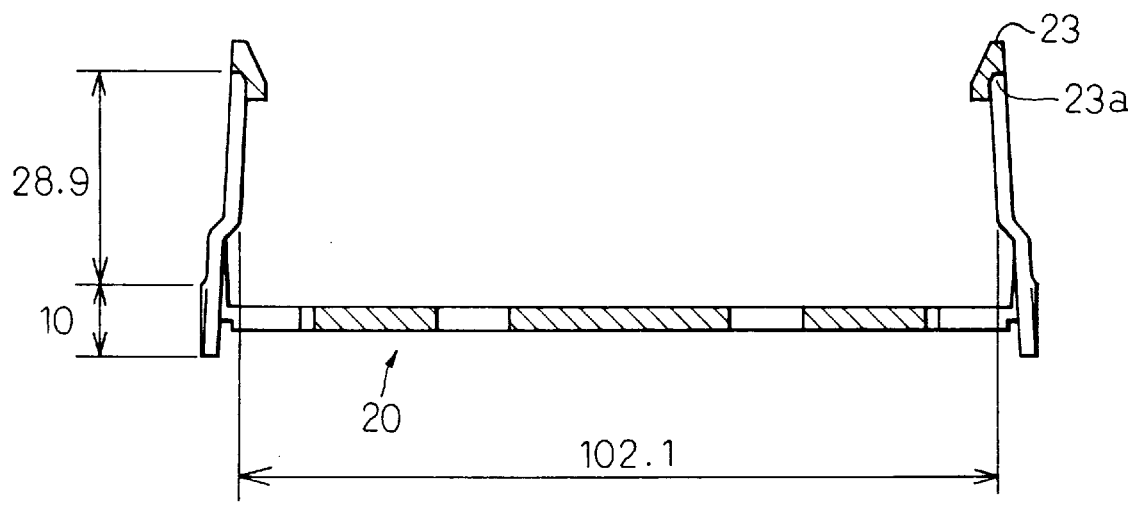
Figure 10C:
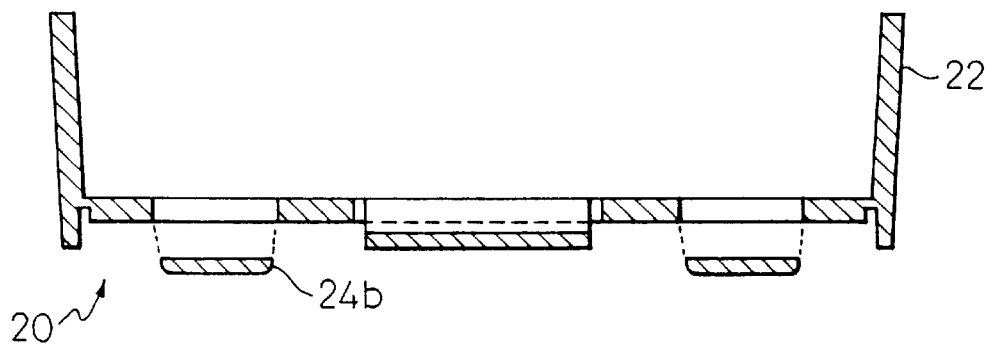
Figure 11:
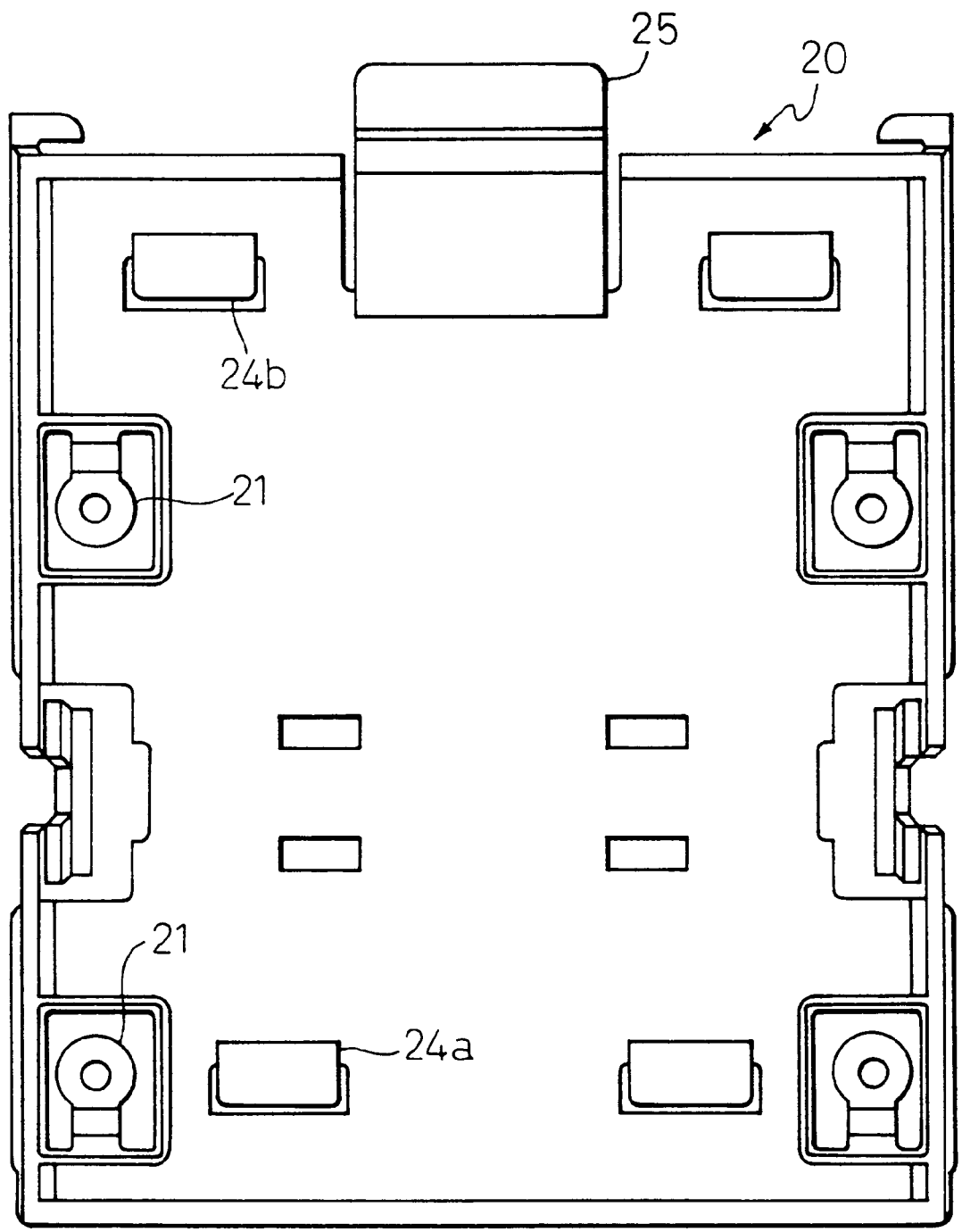
FIG. 11 is a bottom view of the frame.

FIG. 8A is a front view of the frame shown in FIG. 7; FIG. 8B is a back view thereof; and FIG. 8C is a side view thereof. FIGS. 9A, 9B and 9C are cross-sectional views taken along lines A—A, B—B, and C—C in FIG. 7, respectively. Similarly, FIGS. 10A, 10B and 10C are cross-sectional views taken along lines D—D, E—E and F—F in FIG. 7, respectively. FIG. 11 is a bottom view of the frame shown in FIG. 7.

The explanation will be made below with reference to FIGS. 7 to 11. As stated above, FIG. 7 illustrates a frame 20 for carrying an FDD device. The frame 20 has four disk fixtures 21 for an FDD having a similar shape to that of an HDD.

The disk fixture 21 of the frame 20 for an FDD has a center hole for a screw as is the case of the former frame, but the frame 20 is adapted to carry and fasten an FDD even if there are no screws.

As shown in FIGS. 8A–8C side walls 22 are provided in the frame 20 for supporting an FDD to be carried on the frame 20, and disk side retainers 23 are provided in a generally central area of the frame 20 for retaining an FDD. The disk side retainer 23 has a cross-section in an arrow head shape directed upward. Projected supports 20 are provided at the rear end of the frame 20 for abutting to the rear end of an FDD to be carried on the frame 20.

As shown in FIG. 8A or others, the disk side retainer 23 is disposed to slightly incline inward. When an FDD is mounted, the lateral side thereof abuts to the inner side of the disk side retainer 23 to somewhat push the same aside. Due to the elasticity of the resin forming the frame 20, the disk side retainer 23 generates a force to restore the retainer inward to the original position in a state wherein an FDD is mounted, resulting in a function for supporting the lateral side of FDD.

A notch 23a is provided in the upper end portion of the disk side retainer 23. As described in detail later, the notch 23a is used for attaching a retainer plate for pressing a top wall of an FDD mounted to the frame 20 downward.

Four engaging portions 24 are provided on the bottom surface of the frame 20, for attaching the frame 20 to the base plate of the terminal device. A pair of hook-like engaging portions 24a are provided in the vicinity of the rear end of the frame 20. These engaging portions 24 are inserted into holes in the base plate of the terminal device to fasten the frame thereto.

At the rear end of the frame 20, a lever 25 is provided in the same manner as for the FDD frame 10.

Figure 12A:
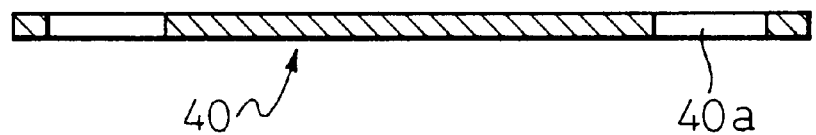
FIG. 12A is a side sectional view.
Figure 12B:
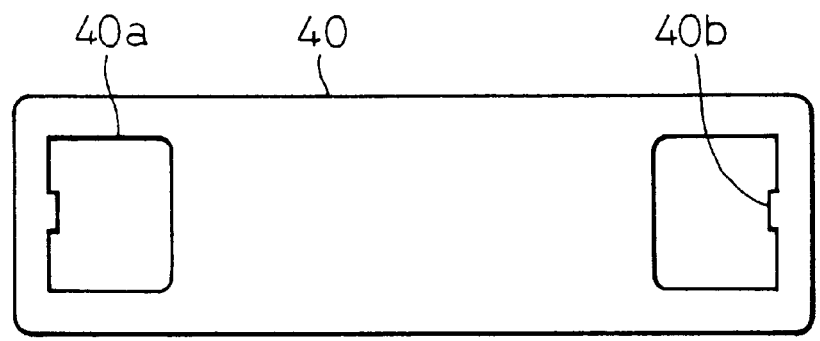
FIG. 12B is a plan view, of a disk retainer plate.

FIGS. 12A and 12B illustrate a retainer plate for fastening an FDD to the frame 20. The retainer plate 40 has a pair of openings 40a in the vicinity of the opposite edges thereof, respectively, each having a hook 40b at the center of the outer inside wall thereof. The distance between the pair of hooks 40b corresponds to a distance between the pair of disk side retainers 23 when FDD is mounted to the frame 20.

Figure 13:
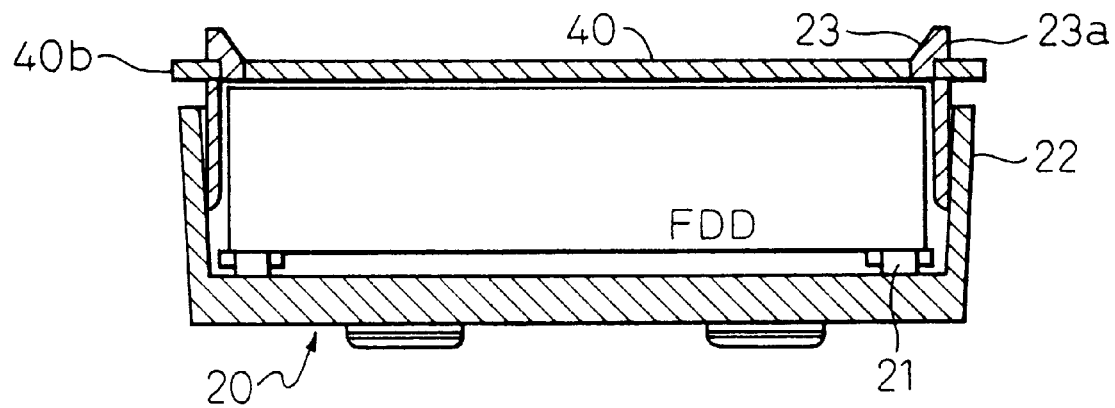
FIG. 13 is an illustration of the frame with an FDD secured thereon.

FIG. 13 illustrates a front sectional view of the frame 20 mounting an FDD with the aid of the retainer plate 40. When an FDD is mounted onto the frame 20, the FDD is initially placed on the disk fixtures 21. In this state, the respective lateral side of the FDD abuts the side surface of the disk side retainer 23, and the top surface of the FDD is brought into contact with the rear end portion of the arrow-shaped end of the disk side retainer 23.

Then, a tip end of the disk side retainer 23 is inserted into the opening of the retainer plate 40. Upon insertion, the hook 40b of the retainer plate 40 is engaged in the notch of the disk side retainer 23 to secure the retainer plate 40.

In such a manner, the FDD is biased upward, as seen in the drawing, by the elasticity of the disk fixture 21 and the disk side retainer 23 while restricting the upward motion by the retainer plate 30, whereby the FDD can be fastened to the frame 20 without using screws. Also, it is possible to absorb the external vibration by the elasticity of the disk fixture 21 to minimize the vibration transmitted to the disk device.

In this regard, the disk device may be fastened with screws when the frame 20 is used.

Figure 14A:
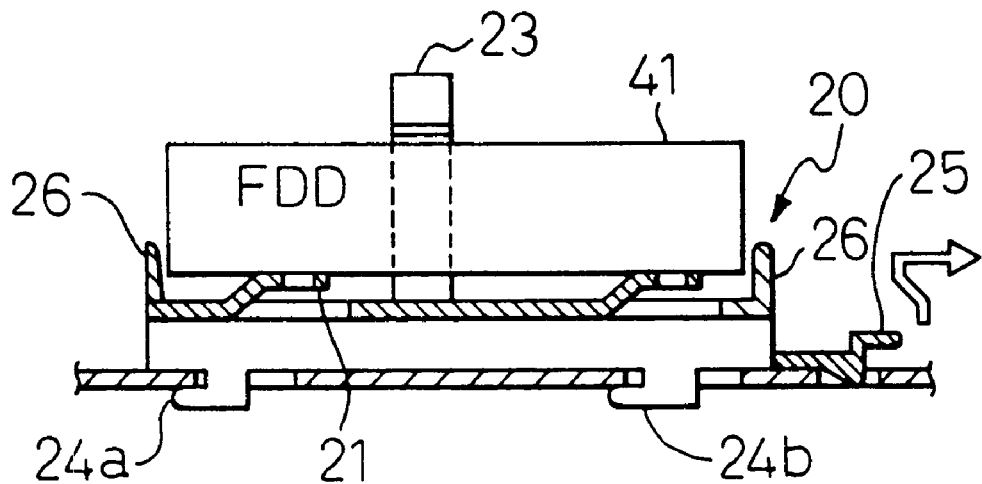
FIG. 14A is a side view of the frame mounted on a base plate.

FIG. 14A is a side view of the frame carrying the disk device thereon and mounted to the base plate of the terminal device, which frame is of a type having the disk retainer on the lateral side thereof as shown in FIGS. 7 to 11.

The bottom wall of the disk device to be mounted to the frame 20 is held by the disk fixtures 21 provided on the bottom surface of the frame 20. As already described above, or shown in FIGS. 14B and 14C, each disk fixture has a central hole for inserting a screw. In this regard, in the embodiment shown in FIG. 14A, no screws are used for fastening the disk.

The disk fixture 21 is shaped by bending part of the bottom wall of the frame. According to such a shape, a bumper-like function is provided due to the elasticity of the resin member.

The frame 20 on which the disk is mounted is attached to the base plate. The base plate has holes for securing the engaging portions 24 provided on the frame. The engaging portions 24a and 24b provided in the front and rear areas of the frame 20, respectively, have a generally C-shaped cross-section so that a gap is formed for receiving the base plate therein. The rear end of the frame has a lever 25 (a hook for the engagement of the base plate illustrated in the drawing) so that a hook provided at the front end thereof is inserted into a hole of the base plate.

The leftward movement of the frame 20 as seen in the drawing is limited by the engaging portions 24a, 24b, and the rightward movement is limited by the hook of the lever 25. The frame 20 is fastened to the base plate by these elements. In this regard, the frame 20 is easily detachable from the base plate by lifting a tab of the lever 25 to release the hook from the hole of the base plate.

Figure 14B:
FIG. 14B is an enlarged view of an encircled frame portion in FIG. 14.
Figure 14C:
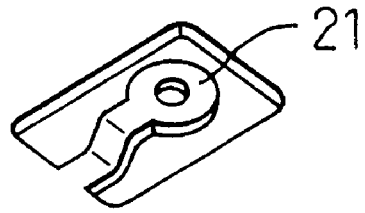
FIG. 14C is a perspective view of the encircled frame portion.

Supports 26 are provided on the front and rear ends (left and right sides in the drawing) of the frame for supporting the disk. In the embodiment shown in FIGS. 14A–14C, since the disk is not fastened by screws or others, the disk may slip down from the frame 20 if it is installed in a vertical direction. The supports 26 provided on the front and rear ends of the frame 20 serve to prevent the disk from slipping down from the frame in such a case. In this regard, the supports 26 provided on the front and rear ends of the frame as shown in FIGS. 14A, 14B, and 14C is more advantageous than the embodiment shown in FIG. 7 wherein the support is provided solely at the rear end of the frame.

The frame shown in FIG. 2 can be attached to the base plate by substantially the same mechanism described above.

Figure 15A:
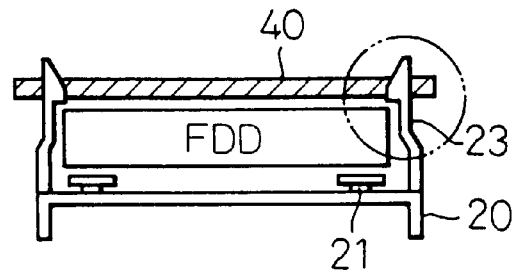
FIGS. 15A, 15B and 15C are front views of the frames carrying three kinds of disk devices thereon, respectively.

FIG. 15A illustrates a state wherein a disk is mounted to the frame 20 shown in FIG. 7. The disk is placed on disk fixtures 21 provided on the bottom surface of the frame 20 and the upper surface thereof is lightly pressed by a retainer plate 40 (disk presser member illustrated). Disk side retainers 23 are provided on the lateral sides of the frame 20, and the retainer plate 40 is mounted to the upper end portions of the disk side retainers 23.

Figure 15B:
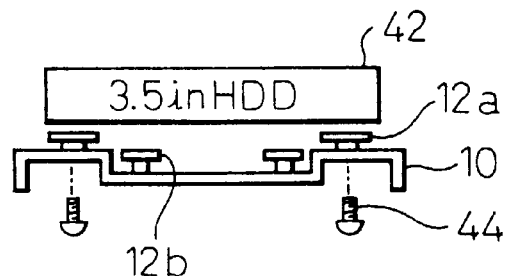
Figure 15C:
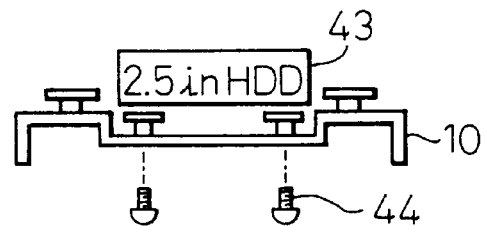
Figure 15D:
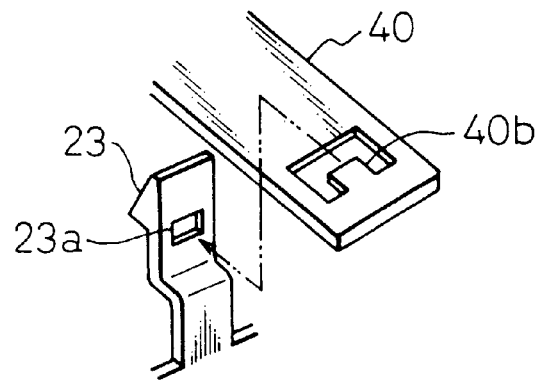
FIG. 15D is an enlarged perspective view of a main portion of the retainer plate encircled in FIG. 15A.

FIG. 15D is an enlarged illustration of the main parts of the disk side retainer 23 and the retainer plate 40. A hook 40b provided on the retainer plate 40 is inserted into a hole 23a provided on the side wall of the disk side retainer 23 and fixed thereto.

FIG. 15B and FIG. 15C are front views wherein a 3.5 inch disk (HDD) and a 2.5 inch disk are mounted to the same frames 10, respectively. In this regard, the frame 10 is one illustrated in FIG. 2.

The 3.5 inch disk 42 is placed on the disk fixtures 12a arranged in the peripheral area of the frame 10, and fastened to the frame 10 by screws 44 inserted from beneath the frame 10.

On the other hand, the 2.5 inch disk is placed on the disk fixtures 12b arranged in the central area of the frame 10, and fastened to the frame 10 by screws 44 inserted from beneath the frame 10.

As described above, in the embodiment shown in FIG. 15A, since screws or the like are unnecessary for fastening the disk to the frame, the disk-fastening operation can be simplified. On the other hand, in the embodiments shown in FIGS. 15B and 15C, although the screws are necessary for fastening the disk, grommets or the like are unnecessary for shock-absorption. Therefore, the total number of parts can be reduced accordingly, and disk attachment/detachment becomes very easy compared with the prior art.

Figure 16:
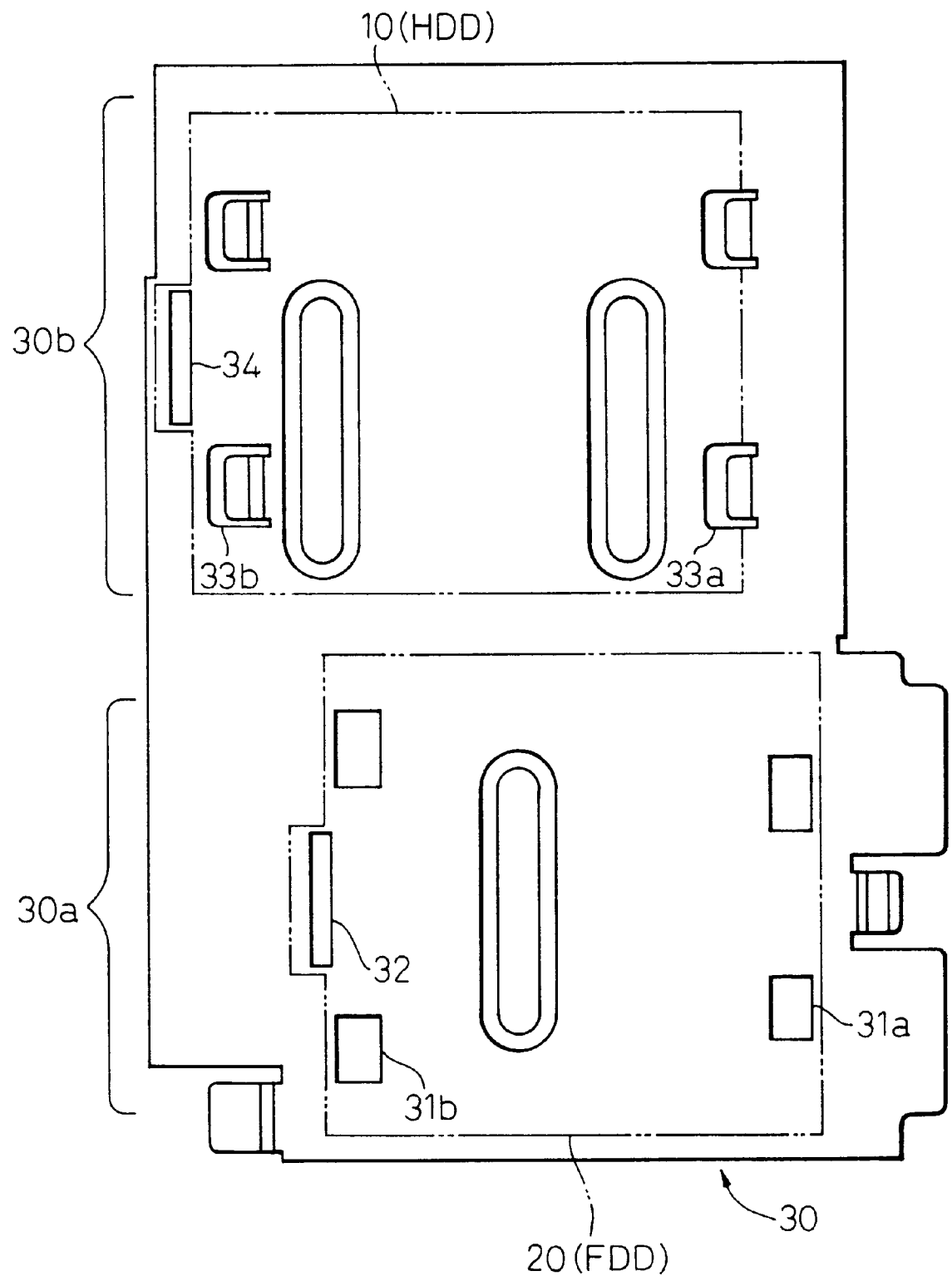
FIG. 16 is an illustration of a base plate of a terminal device.

FIG. 16 illustrates a base plate of a terminal device, to which the above-mentioned frames are fastened.

In this drawing, reference numeral 30 denotes a frame; 30a a section to which the frame 20 shown in FIG. 7 is mounted; and 30b a section to which the frame 10 shown in FIG. 2 is mounted.

The base plate is made of metal.

The section 30a is provided with engagement holes 31a to be inserted by the engaging portions 24a provided on the frame 20, engagement holes 31b to be inserted by the engaging portion 24b, and an elongated hole 32 to receive the hook of the lever 25.

In a similar manner, the section 30b is provided with base plate engaging portion 33a to receive the engaging portions 16a provided at the front end of the frame 10, base palate engaging portion 33b to receive the engaging portions 16b provided at the rear end of the frame 10, wherein the base palate engaging portions 33a, 33b are provided in the front and rear areas of the base plate, respectively. The base palate engaging portions 33a and 33b are formed by bending part of the bottom wall of the base plate upward, so that the engaging portions 16a, 16b of the frame can be inserted into gaps formed between the base plate engaging portions 33a, 33b and the bottom wall of the base plate 30, respectively.

FIGS. 17A and 17B illustrate the operation for mounting the frame 10 onto the base plate, wherein FIG. 17A is prior to the mounting of the frame 10 and FIG. 17B is after the mounting of the frame 10. In this regard, for clarifying the drawing, part of the lever 16 is shown as a cross-section in FIGS. 17A and 17B.

As is apparent from FIGS. 17A and 17B, the base plate engaging portions 33a and 33b on the base plate are formed by bending part of the bottom wall of the base plate 30. When the frame 10 is mounted to the base plate 30, the engaging portions 16a and 16b are inserted first into the base plate engaging portions 33a and 33b, respectively. Thereafter, the lever 14 at the rear end of the frame 10 is inserted into the elongate hole 34 provided on the base plate 30 to secure the frame 10 to the base plate 30.

The leftward movement of the frame 10 as seen in the drawing is limited by the base plate engaging portions 33a and 33b, and the rightward movement is limited by the hook of the lever 14 inserted into the elongate hole 34.

FIGS. 18A and 18B illustrate the operation for mounting the frame 20 onto the base plate, wherein FIG. 18A is prior to the mounting of the frame 20 and FIG. 18B is after the mounting of frame 20, respectively.

When the frame 20 is mounted to the base plate 30, the engaging portions 24a, 24b are inserted into the engaging holes 31a, 31b of the base plate 30, respectively. Then, the lever 25 of the frame 20 is inserted into the elongate hole 32 of the base plate 30 to limit the leftward movement of the frame 20 as seen in the drawing.

According to the structure shown in FIGS. 17A, 17B, or 18A, 18B, the frame can be mounted to the base plate without screws or the like. This enables one-touch frame attachment/detachment to simplify the operation for mounting the frame carrying the disk device onto the base plate.

Also, it is possible to reduce the manufacturing cost because the number of parts can be reduced and the frame can be molded of a relatively inexpensive resin.

The frames described hereinbefore are made of a resin. However, the frame may be formed of any of materials provided it is elastic, such as a thin metallic sheet.

FIG. 19 illustrates the operation for mounting a frame to a base plate according to another embodiment of the present invention. A frame 20' shown in FIG. 19 is capable of carrying either an HDD or an FDD.

Concretely, the frame 20' has eight disk fixtures on the bottom surface thereof. Disk fixtures 21a arranged in the peripheral area are used for mounting a 3.5 inch HDD or an FDD, while disk fixtures 21b arranged in a central area are used for mounting a 2.5 inch HDD. At the center of the respective disk fixture, a hole for a screw is provided in the same manner as in the first embodiment.

The bottom surface of the frame 20' has two stages; a lower stage having the disk fixtures 21b and an upper stage having the disk fixtures 21a, respectively. These disk fixtures are operated in the same manner as those of the frame 10.

On the lateral side of the frame 20', a disk side retainer 23 is provided. The disk side retainer 23 shown in FIG. 19 has a shape substantially the same as that of the disk side retainer 23 shown in FIG. 7.

FDD and 3.5 inch HDD are mounted onto the frame 20' shown in FIG. 19 by a retainer plate 40 (disk presser member). The 2.5 inch HDD is fastened to the disk fixtures 21b by screws because the upper surface of HDD does not reach the retainer plate 40. Of course, a 3.5 inch HDD and an FDD may be fastened to the disk fixtures 21a by screws.

At the front and rear end of the frame 20' shown in FIG. 19, supports 26a, 26b are provided, respectively. These are used for preventing a 3.5 inch HDD or the like, which is placed on the frame 20' without being fastened by screws, from slipping down from the frame 20' when the same is installed in the vertical position.

On the bottom surface of the frame 20', engaging portions 24 are provided to be inserted into engaging holes 31 on the base plate 30.

Figure 20A:
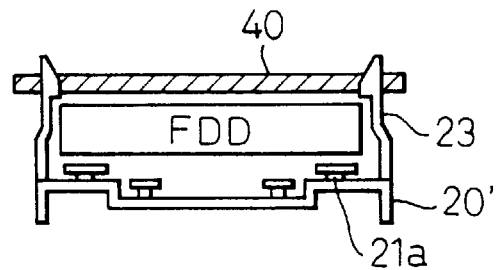
FIGS. 20A, 20B, and 20C are front views of a further frame carrying three kinds of disk devices thereon, respectively.
Figure 20B:
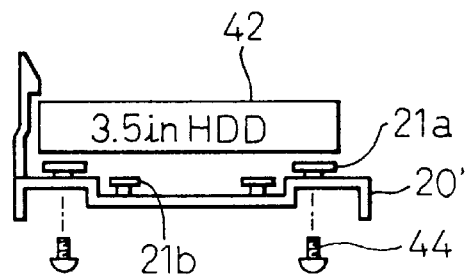
Figure 20C:
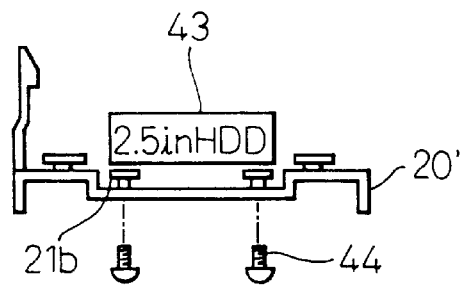
Figure 20D:
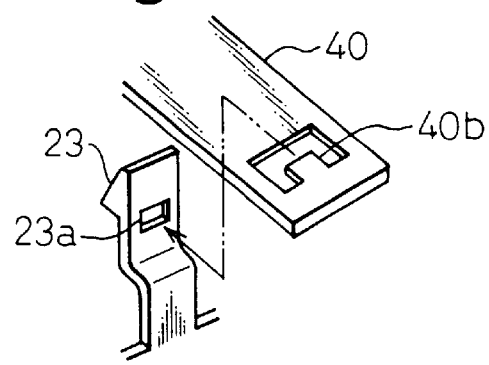
FIG. 20D is an enlarged perspective view of a main portion of the retainer plate.

FIGS. 20A, 20B, and 20C are front views of the frame 20' shown in FIG. 19, on which an FDD, a 3.5 inch HDD and a 2.5 inch HDD are carried.

In FIG. 20A, an FDD is carried on the frame 20'. In FIGS. 20B and 20C, a 3.5 inch HDD and a 2.5 inch HDD are carried on the frame 20', respectively.

In FIGS. 20B and 20C, the disk side retainer 23 is not used at all for securing an HDD at a position. However, this structure is advantageous because various disk device can be mounted to a common frame as shown in FIGS. 20A–20C, which results in the reduction in the number of parts. In this regard, the rightside disk side retainer 23 is eliminated from FIGS. 20B and 20C for the purpose of simplicity.

While the frame of this embodiment has a two-staged bottom surface, it may alternatively have a single-staged bottom surface. In the latter case, it is possible to secure 2.5 inch HDD without screws by a retainer plate 40.

Figure 21A:
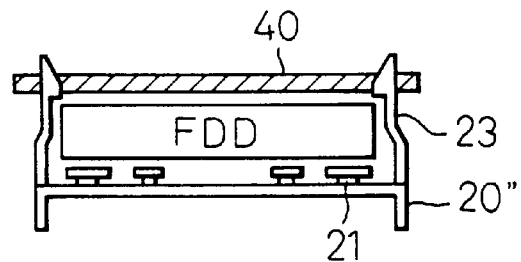
FIGS. 21A, 21B, and 21C are front views of a yet further frame carrying three kinds of disk devices thereon, respectively.
Figure 21B:
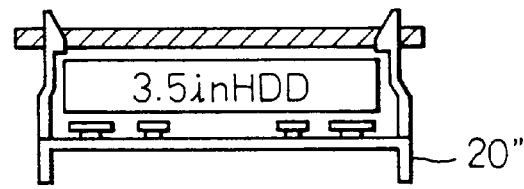
Figure 21C:
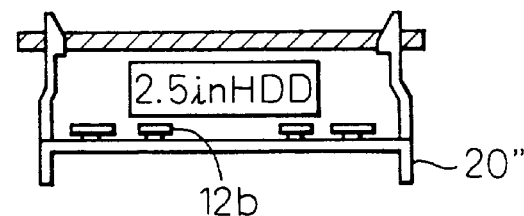
Figure 21D:
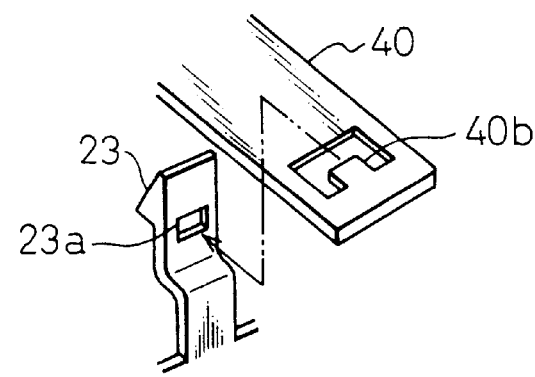
FIG. 21D is an enlarged perspective view of a main portion of the retainer plate.

FIGS. 21A, 21B, and 21C are front views of a frame 20" having a single-staged bottom surface, on which an HDD, an FDD or another device is mounted. In either of FIGS. 21A to 20C, the disk device is secured to the frame 20" with a retainer plate 40. Accordingly, no screws are necessary for fastening the disk to the frame, which is different from any of the preceding embodiments. In this regard, if the upper surface of an HDD or another device does not reach the retainer plate 40 or, as shown in FIG. 20C, the disk device has an excessively short width and may displace in the lateral direction, the disk device, of course, may be screw-fastened.

In such a case, there may be a possibility of erroneous fastening of the disk device to improper disk fixtures because the bottom surface is single-staged. Therefore, it is favorable to provide a note on the frame, indicating proper disk fixtures for fastening the corresponding disk device.

It is to be understood that the invention is by no means limited to the specific embodiments illustrated and described herein, and that various modifications thereof may be made which come within the scope of the present invention as defined in the appended claims.

We claim:

1. A terminal device comprising:
    a frame made of a flexible member for detachably mounting an information storage device for storing information, said frame containing a plurality of storage device fixtures raised above an upper surface of said frame for supporting a bottom surface of the information storage device placed thereon; and
    a base plate for detachably mounting the frame for mounting the storage device.

2. The terminal device of claim 1, wherein the storage device mounting frame is made of a flexible member.

3. The terminal device of claim 1, wherein frame side engaging portions are provided on the bottom surface of the storage device mounting frame, to be inserted into mating engaging portions provided on the based plate, and
    the storage device mounting frame is provided with means for limiting the movement of the base plate in the inserting direction of the storage device mounting frame into the base plate, when the frame side engaging portions are engaged with the based plate side engaging portions, so that the storage device mounting frame is fastened to the base plate.

4. A storage device fastening mechanism for detachably mounting a storage device for storing information, wherein
    the fastening mechanism is integrally formed of a flexible member, and has a plurality of storage device fixtures raised above an upper surface thereof, for supporting a bottom surface of the information storage device placed thereon.

5. The storage device fastening mechanism of claim 4, wherein each one of the storage device fixtures has a hole for a screw so that the storage device is fastened to the storage device fixture by the screw.

6. The storage device fastening mechanism of claim 4, further comprising:
    a retainer for retaining opposite sides of the storage device to be mounted,
    the retainer being provided with an engaging portion to be engageable with a member for holding the upper side of the storage device.

7. The storage device fastening mechanism of claim 4, further comprising:
    a first storage device fixture for fastening a first storage device, and
    a second storage device fixture for fastening a second storage device having a size different from that of the first storage device.

8. The storage device fastening mechanism of claim 7, wherein an area of the upper surface of the storage device fastening mechanism in which the first storage device fixture is provided and that in which the second storage device fixture is provided and that in which the second storage device fixture is provided are at different levels from each other.

9. A storage device fastening mechanism for detachably mounting a storage device for storing information onto a terminal device, wherein engaging portions are provided on a bottom surface thereof, to be inserted into a base plate of the terminal device so as to hold said fastening mechanism and said base plate together.

10. A storage device fastening mechanism for fastening a storage device to be mounted to a terminal device, comprising:
    a plurality of storage device fixtures made of a flexible material and provided on an upper surface of the storage device fastening mechanism, to be engageable with the bottom surface of the storage device,
    a fastening mechanism mounting portion provided on a surface opposite to the surface on which the storage device fixtures are provided, for mounting the storage device fastening mechanism to the terminal device, and a mounting mechanism for fastening the storage device fastening mechanism mounted to the terminal device to the terminal device.

11. The storage device fastening mechanism of claim 10, wherein the mechanism is integrally formed of a flexible member, and the storage device fixture is adapted to support the bottom surface of the storage device by the elasticity of the flexible member.

12. The storage device fastening mechanism of claim 10, wherein the storage device fixture comprises a first fixture for fastening a first storage device, and a second fixture for fastening a second storage device having a different size from that of the first storage device.

13. The storage device fastening mechanism of claim 12, wherein an area in the upper surface of the storage device fastening mechanism, in which one of the first and second fixtures corresponding to the storage device of a smaller size is provided, is at a level lower than that for the other storage device.

14. The storage device fastening mechanism of claim 10, further comprising a storage device retainer for holding a side of the storage device; the storage device retainer having a mounting portion for mounting a plate-like member for pressing the upper surface of the storage device secured to the storage device fastening mechanism.

15. A storage device mounting mechanism comprising:

a base plate having openings;

hook-shape engaging portions to be inserted into said openings of the base plate;

a stopper to limit the movement of the base plate while the engaging portions are inserted into the openings;

flexible disk fixtures on which the storage device is to be placed; disk side retainers which are upstanding from the mounting surface; and retainer plates provided on the disk side retainers, for holding the upper surface of the storage device.

16. A storage device mounting mechanism comprising:

a base plate having openings;

hook-shape engaging portions to be inserted into said openings of the base plate;

a stopper to limit the movement of the base plate while the engaging portions are inserted into the openings; and flexible disk fixtures on which the storage device is to be placed, wherein the disk fixtures have first disk fixtures and second disk fixtures which are smaller than the first disk fixtures, and wherein a mounting surface height of the second disk fixtures is different from a mounting surface height of the first disk fixtures.

17. A storage device mounting mechanism comprising:

a base plate having openings;

hook-shape engaging portions to be inserted into said openings of the base plate;

a stopper to limit the movement of the base plate while the engaging portions are inserted into the openings; and four flexible disk fixtures on which the storage device is to be placed, wherein all of the disk fixtures are provided on the base plate.

18. The storage device according to claim 17, wherein the disk fixtures are oriented in the longitudinal direction of the storage device.

19. The storage device according to claim 17 or 18, wherein all of the disk fixtures are provided on the same mounting side of the base plate.

* * * * *